United States Patent
Brown et al.

(10) Patent No.: US 10,741,835 B1
(45) Date of Patent: Aug. 11, 2020

(54) ANODE STRUCTURE FOR A LITHIUM METAL BATTERY

(71) Applicant: Apple Inc., Cupertino, CA (US)

(72) Inventors: Karl M. Brown, Los Gatos, CA (US); Alan A. Ritchie, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 168 days.

(21) Appl. No.: 16/102,863

(22) Filed: Aug. 14, 2018

Related U.S. Application Data

(60) Provisional application No. 62/547,152, filed on Aug. 18, 2017.

(51) Int. Cl.
| | |
|---|---|
| *H01M 4/66* | (2006.01) |
| *H01M 4/38* | (2006.01) |
| *H01M 4/80* | (2006.01) |
| *H01M 10/0525* | (2010.01) |
| *H01M 4/04* | (2006.01) |
| *H01M 4/02* | (2006.01) |
| *H01M 4/62* | (2006.01) |
| *H01M 4/36* | (2006.01) |

(52) U.S. Cl.
CPC .............. *H01M 4/366* (2013.01); *H01M 4/02* (2013.01); *H01M 4/045* (2013.01); *H01M 4/0445* (2013.01); *H01M 4/382* (2013.01); *H01M 4/62* (2013.01); *H01M 4/661* (2013.01); *H01M 4/667* (2013.01); *H01M 4/80* (2013.01); *H01M 10/0525* (2013.01); *H01M 2004/021* (2013.01); *H01M 2004/027* (2013.01)

(58) Field of Classification Search
CPC .. H01M 4/045; H01M 4/0438; H01M 4/0445; H01M 4/0447; H01M 4/0459; H01M 4/366; H01M 4/62; H01M 4/621; H01M 4/622; H01M 4/623; H01M 4/667
See application file for complete search history.

(56) References Cited

U.S. PATENT DOCUMENTS

| | | | | | |
|---|---|---|---|---|---|
| 5,470,357 | A | * | 11/1995 | Schmutz | .............. C08J 9/28 29/623.1 |
| 6,024,773 | A | * | 2/2000 | Inuzuka | .............. H01M 10/0525 29/623.4 |
| 2004/0219432 | A1 | * | 11/2004 | Kojima | .............. H01M 4/0438 429/231.95 |

(Continued)

OTHER PUBLICATIONS

Um, Ji Hyun, et al., "3D Macroporous Electrode and High-Performance in Lithium-Ion Batteries Using SnO2 coated on Cu Foam", Scientific Reports, Published Jan. 4, 2016, www.nature.com/scientificreports (9 pp).

(Continued)

*Primary Examiner* — Gregg Cantelmo
(74) *Attorney, Agent, or Firm* — Young Basile Hanlon & MacFarlane, P.C.

(57) ABSTRACT

An anode for a lithium metal battery includes a current collector, a seed layer deposited onto the current collector, the seed layer comprising a seed material selected to promote electrochemical plating of metallic lithium onto the seed layer, a separator, a host structure between the seed layer and the separator, the host structure having void spaces configured to host metallic lithium during charging, a first adhesion layer bonding the host structure to the seed layer, and a second adhesion layer bonding the host structure to the separator.

21 Claims, 4 Drawing Sheets

(56) References Cited

U.S. PATENT DOCUMENTS

| | | |
|---|---|---|
| 2010/0216026 A1 | 8/2010 | Lopatin et al. |
| 2010/0285360 A1* | 11/2010 | Kozinsky ................ H01M 4/38 |
| | | 429/231 |
| 2010/0330425 A1 | 12/2010 | Lopatin et al. |
| 2011/0003199 A1* | 1/2011 | Yamamura ............ H01M 4/134 |
| | | 429/188 |
| 2011/0129732 A1 | 6/2011 | Bachrach et al. |
| 2014/0377651 A1 | 12/2014 | Kwon et al. |
| 2016/0226070 A1 | 8/2016 | Lopatin et al. |
| 2016/0293943 A1 | 10/2016 | Hu et al. |
| 2017/0133662 A1 | 5/2017 | Cui et al. |

OTHER PUBLICATIONS

Liu, Yayuan, et al., "Lithium-Coated Polymeric Matrix as a Minimum Volume-Change and Dendrite-Free Lithium Metal Anode", Nature Communications, Published Mar. 18, 2016, www.nature.com/naturecommunications (9 pp).

\* cited by examiner

US 10,741,835 B1

ANODE STRUCTURE FOR A LITHIUM METAL BATTERY

CROSS-REFERENCE TO RELATED APPLICATIONS

This application claims the benefit of United States Provisional Application No. 62/547,152, filed on Aug. 18, 2017, the content of which is hereby incorporated by reference in its entirety for all purposes.

TECHICAL FIELD

This application generally relates to anodes of lithium metal batteries.

BACKGROUND

Lithium metal batteries have a higher energy density than conventional lithium ion batteries. During battery operation, lithium is continuously deposited and removed. However, as lithium is deposited, the lithium may not deposit and grow uniformly. Rather, the lithium metal can form dendrites. The formation of dendrites results in a non-uniform lithium surface which further results in greater non-uniform lithium deposition. As the dendrites grow from this non-uniform deposition, battery deterioration occurs, for example, as the lithium dendrites reach the other electrode, short circuiting the battery.

SUMMARY

The disclosed embodiments provide an anode for a lithium metal battery that includes a current collector, a seed layer deposited onto the current collector, the seed layer comprising a seed material selected to promote electrochemical plating of metallic lithium onto the seed layer, a separator, a host structure between the seed layer and the separator, the host structure having void spaces configured to host metallic lithium during charging, a first adhesion layer bonding the host structure to the seed layer, and a second adhesion layer bonding the host structure to the separator.

In some embodiments, each of the first adhesion layer and the second adhesion layer is one of a porous PVDF or a polymer electrolyte.

In some embodiments, the host structure has a void space of ≥60% and ≤80%.

In some embodiments, the host structure is a layer of material having columnar voids created through a thickness of the layer, each columnar void having a diameter of between 0.5 μm and 5 μm, inclusive.

In some embodiments, the columnar voids are each the same diameter.

In some embodiments, a coating of additional seed material is formed on an internal surface of the columnar voids to promote wetting of the metallic lithium.

In some embodiments, the host structure is formed of fibers of a material selected from the group consisting of PVDF, PAN, cellulose, PVA, glass, aramid fibers, porous polyimide and combinations thereof.

In some embodiments, the host structure has voids each having a diameter of between 0.5 μm and 5 μm.

In some embodiments, a coating of additional seed material is formed on the fibers to promote wetting of the metallic lithium.

In some embodiments, the host structure has a thickness that is ≥20 μm and ≤40 μm.

In some embodiments, the seed layer is a first layer of one or more of copper, tin, zinc, silicon.

In some embodiments, the seed layer comprises a second layer of lithium metal deposited on the first layer.

In some embodiments, the seed layer is one or more of Sn, SnO and SnN.

In some embodiments, the seed layer is one or a combination of lithium and lithium alloys.

In some embodiments, the seed layer has a thickness that is ≥10 nm and ≤200 nm.

Also disclosed is an anode for a lithium metal battery having a current collector, a seed layer deposited onto the current collector, the seed layer comprising a material that promotes lithium plating, a separator, a host structure between and bonded to the seed layer and the separator, the host structure having a total void space of ≥60% and ≤80% and individual void spaces having a diameter between 0.5 μm and 5.0 μm, inclusive, and a coating of a lithiophilic material on a surface of the host structure defining the individual void spaces.

Also disclosed is a lithium metal battery comprising a cathode having a cathode current collector, a cathode active material comprising a lithium transition metal oxide, an electrolyte and an anode as disclosed herein.

Another aspect of the disclosed embodiments is a battery pack having a plurality of lithium metal batteries.

DETAILED DESCRIPTION

The embodiments of the lithium metal anode and the lithium metal battery disclosed herein provide increased surface area onto which lithium will uniformly deposit during charging. The lithium is deposited along the surface area of the host structure, reducing or eliminating the dendrite formation that typically occurs. The bonding of the host structure to adjacent layers prevents lithium from growing between the host structure and adjacent layers, maintaining a constant anode thickness. The improved surface morphology provides improved lithium distribution, thereby improving battery performance and reducing the potential for short circuiting.

Figure 1:
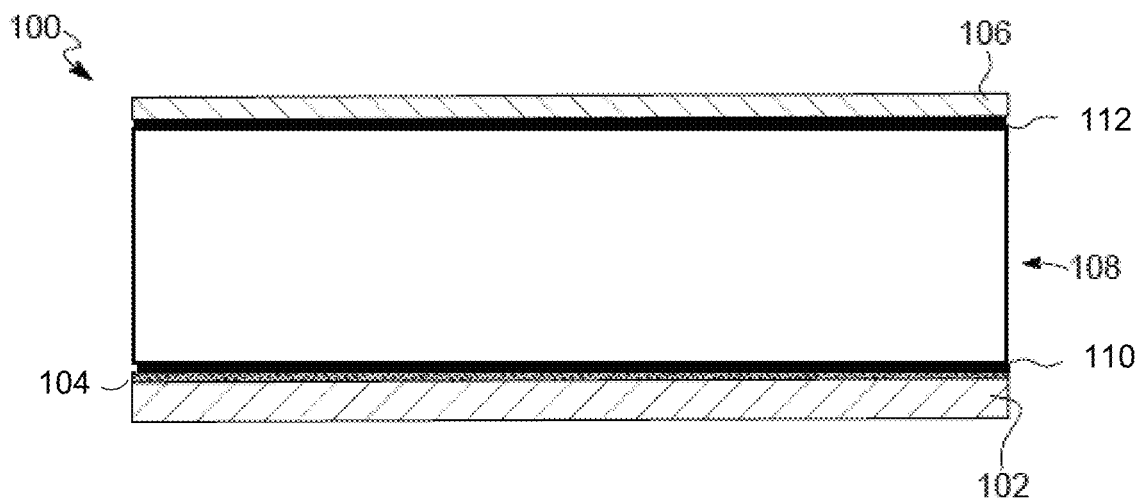
FIG. 1 is a schematic cross-section of an exemplary lithium metal anode as described herein.

FIG. 1 is an embodiment of an anode for a lithium metal battery as disclosed herein. The anode 100 includes a current collector 102, a seed layer 104 deposited onto the current collector 102, a separator 106 and a host structure 108 between the seed layer 104 and the separator 106. A first adhesion layer 110 bonds the host structure 108 to the seed layer 104, and a second adhesion layer 112 bonds the host structure 108 to the separator 106.

The current collector 102 is a metal such as copper or nickel and can be in sheet or foil form, as non-limiting examples. The current collector 102 has a thickness between approximately 8 µm and 14 µm.

The seed layer 104 is a seed material that is deposited onto the current collector 102 using thin film techniques such as electroplating or electrochemical deposition. The term "layer" as used herein includes both a uniform and a non-uniform thin coating or deposition. A non-uniform coating or deposition will have one or more of holes, craters, voids, bumps, thinner areas, thicker areas and other defects that occur naturally due to one or both the type of application and the morphology of the substrate on which the layer is formed. The seed layer 104 can have a thickness of between 10 nm and about 3 µm. More particularly, the seed layer 104 can have a thickness of between about 10 nm and about 200 nm or between about 10 nm and about 100 nm.

The seed material of the seed layer 104 is selected to improve electrochemical plating of metallic lithium during charging of the lithium metal battery. Lithium plates to the seed material of the seed layer 104 better than the lithium plates to the material of the current collector 102. Seed materials include, but are not limited to, Sn, Zn, Si, Cu, SnO, SnN, ZnO and $SiO_2$. The seed material can also be lithium or a lithium alloy such as LiMg or LiAl. The seed material can be pre-alloyed with lithium by heating the materials together at the requisite temperature (e.g. ~160° C.) until the materials are reacted. Pre-alloying with lithium may prevent an initial loss of capacity when cycling is initiated as the lithium first deposited on a seed layer having no pre-alloyed lithium will be unavailable for further reaction.

Figure 2:
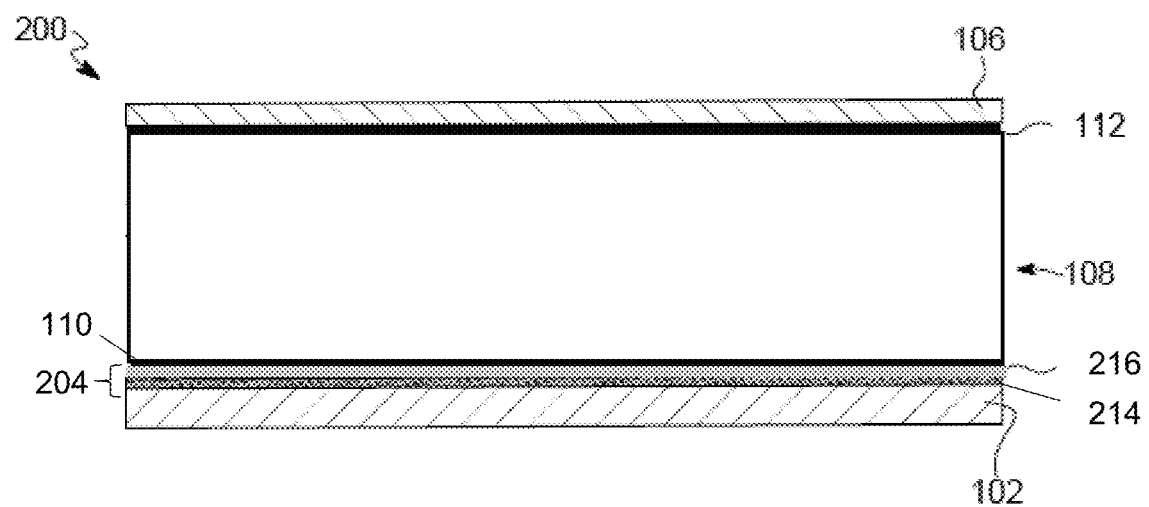
FIG. 2 is a schematic cross-section of another exemplary lithium metal anode as described herein.

As illustrated in FIG. 2, an anode 200 can have a seed layer 204 that includes a first layer 214 of seed material and a second layer 216 of lithium metal on the seed material of the first layer 214. Like the pre-alloyed lithium, this lithium metal second layer 216 prevents an initial loss of capacity when cycling is initiated as the lithium first deposited on a seed layer having no pre-alloyed lithium will be unavailable for further reaction.

The host structure 108 of the anode 100, 200 is configured to host plated metallic lithium on the internal surfaces of the host structure 108 during charging. The host structure 108 is a scaffold-like structure that provides void space in which the deposited lithium can build. The host structure 108 has a void space between ≥60% and ≤80%, inclusive. The host structure 108 is made of a material that is wetted well by the electrolyte material and is a material onto which the lithium will plate. Polar polymers such as polyvinylidene fluoride (PVDF), polyacrylonitrile (PAN), cellulose, polyvinyl alcohol (PVA), polyimide, glass and aramid fibers may be used. Porous metals having a pore size between about 0.2 µm to 2.0 µm may also be the material from which the host structure 108 is made.

Figure 3:
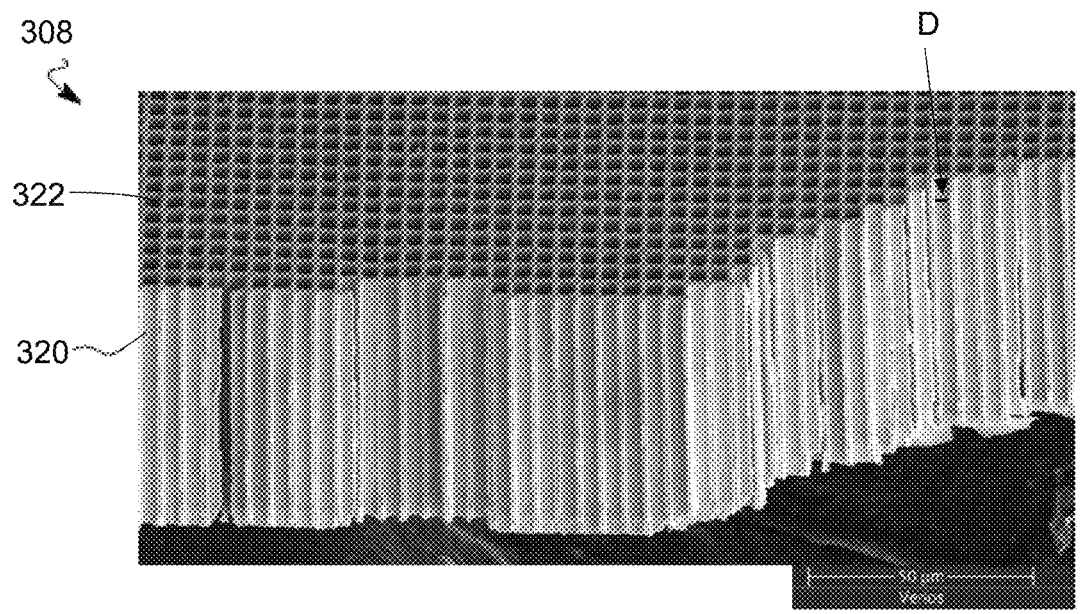
FIG. 3 is a scanning electron microscope (SEM) image of an exemplary host structure of the lithium metal anodes disclosed herein.

FIGS. 3-8 illustrate different host structures 108 that can be used as the anodes disclosed herein. FIG. 3 illustrates a host structure 308 that is a layer of material having columnar voids 320 created through a thickness of the layer. Each columnar void 320 has a diameter D of between 0.5 µm and 5 µm, inclusive. The columnar voids 320 can be uniform in both distribution and diameter D as illustrated. The columnar voids 320 can also have a non-uniform distribution. The columnar voids 320 can also vary in diameter D, so long as the diameter D is between 0.5 µm and 5 µm, inclusive. As noted, the total void space in the host structure 308 is between ≥60% and ≤80%.

The diameter D of the columnar voids is selected to confine the lithium. Lithium plates with a somewhat characteristic scale. Without any confinement, lithium will typically show "nugget-like" features of ~1-5 µm in size. The more lithium that plates, the more these small nuggets will branch and create lower density features, such as dendrites. The host structures herein are designed to contain the lithium on the length scale similar to these nuggets, with the lithium remaining dense and confined by the host structure.

Figure 4:
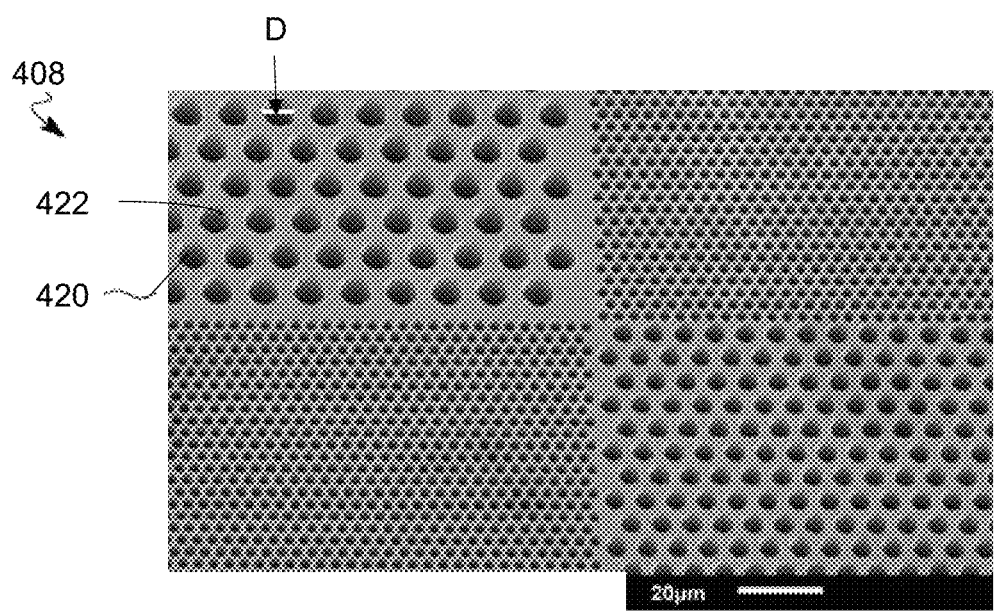
FIG. 4 is a scanning electron microscope (SEM) image of another exemplary host structure of the lithium metal anodes disclosed herein.

FIG. 4 illustrates another aspect of the host structure 308 of FIG. 3. Host structure 408 is also a layer of material having columnar voids 420 created through a thickness of the layer. Each columnar void 420 has a diameter D of between 0.5 µm and 5 µm, inclusive. FIGS. 3 and 4 are non-limiting examples of distribution, shape and uniformity of the columnar voids 320, 420. Other distributions, shapes and uniformities are contemplated.

Figure 5:
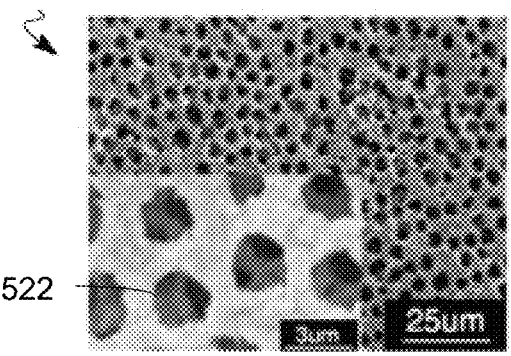
FIG. 5 is a scanning electron microscope (SEM) image of another exemplary host structure of the lithium metal anodes disclosed herein.
Figure 6:
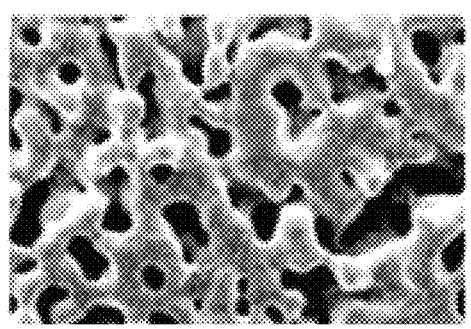
FIG. 6 is a scanning electron microscope (SEM) image of another exemplary host structure of the lithium metal anodes disclosed herein.
Figure 7:
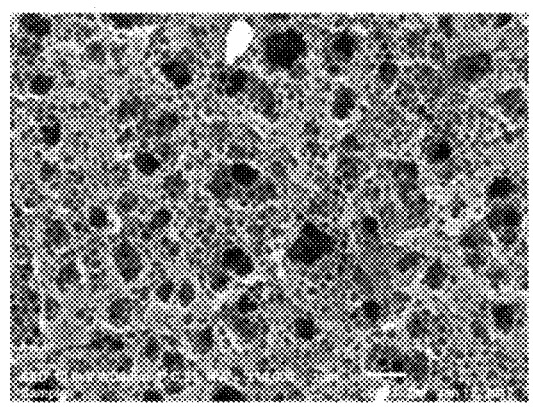
FIG. 7 is a scanning electron microscope (SEM) image of another exemplary host structure of the lithium metal anodes disclosed herein.

FIGS. 5-8 illustrate different host structures that are scaffold structures formed of varying materials that provide the requisite void space. The host structures can be non-uniform, and be of a foam-like material, each host structure having void spaces between 0.5 µm and 5 µm, inclusive, with a total void area of between ≥60% and ≤80%. The host structure 508 shown in the SEM image in FIG. 5 is made of nickel. The host structure 608 shown in the SEM image in FIG. 6 is made of copper. The host structure 708 shown in the SEM image in FIG. 7 is made of porous polyamide. A host structure can be made, for example, by molding wax pellets to define the void spaces of the host structure, adding the host material around the molded wax pellets to form the host structure and melting the wax pellets to create the void space.

Figure 8A:
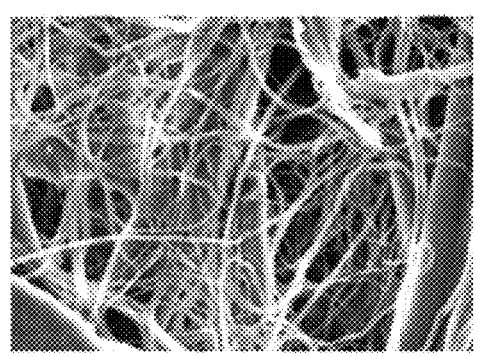
FIGS. 8A and 8B are scanning electron microscope (SEM) images of other exemplary host structures of the lithium metal anodes disclosed herein.
Figure 8B:
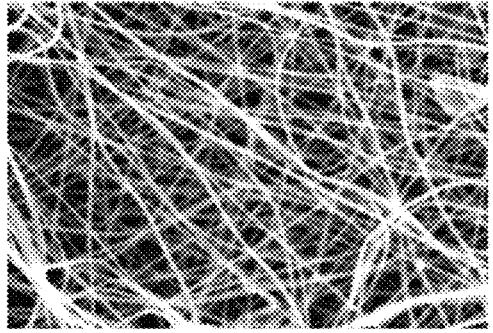

The host structure 108 can be formed of fibers. The fibers may be conductive, the fibers may be nonconductive, or a portion of the fibers may be conductive. Conductive fibers may be used only near the current collector 102 to encourage penetration of the lithium metal through the host structure 108. The fibers can be free-standing or formed in a mat, mesh or other fibrous structure, as non-limiting examples, made of the requisite material with the requisite void space. The fibers may be electrospun fibers. FIG. 8A is an SEM image of a fiber-based host structure 808. The fibers in FIG. 8A are a mix of PAN and cellulose, with the microfibers providing strength and the nano-fibers providing porosity. FIG. 8B is an SEM image of electrospun fibers of PAN as a host structure 808'.

To further promote lithium plating onto the host structure 108, the internal surface area of the host structure 108, the surfaces defining the void spaces, can be coated with a coating. The coating can be seed material that is the same seed material used in the seed layer 104, a lithium metal layer, or both, as described with respect to the seed layer 204 in FIG. 2. Known thin-film techniques can be used to apply the coating. The coating can cover anywhere from a portion to all the internal surface area of the host structure 108. For example, the portion of the host structure 108 closest to the current collector 102 can be coated, as an extension of the seed layer 104, to promote the penetration of the lithium through the host structure 108 from the separator 106 to the current collector 102. The internal surface area is, for example, the internal surfaces 322, 422 of the columnar voids 320 of FIGS. 3 and 4 or the internal voids 522 of FIG. 5. The fibers 824 of FIGS. 8A and 8B may be coated with the seed material, ensuring that void spaces between fibers are defined by the coated surface.

The host structure 108 prevents "breathing" of the lithium metal anode as it charges and discharges. Breathing occurs with conventional lithium metal anodes because as the cell charges and discharges, the amount of lithium in the anode increases and decreases. Therefore, the thickness of the anode increases and decreases. The host structure 108 has a thickness that is ≥20 µm and ≤40 µm. The host structure 108 provides a fixed thickness and the void space 114 of the host structure 108 fills and empties as the battery cycles. The thickness of the anode does not change during charge and discharge. The choice of the thickness of the host structure 108 will depend on the amount of lithium required to meet cell design parameters, including the excess amount of lithium desired and targeted cycle life.

In order to prevent breathing, the host structure 108 is bonded to the adjacent layers, such as the separator 106 and the seed layer 104. The bonding is achieved with the adhesion layers 110, 112. The inventors have found that bonding of the particular materials is best achieved using a porous PVDF, with or without a ceramic particle filler, or a polymer electrolyte. The separator 106 can be polyethylene or polypropylene, as examples. Lithium does not like to plate on the separator material, the separator 106 acting as a lid on the host structure 108 so that the lithium metal plates only within the area of the host structure 108, thereby preventing short circuiting. The host structure 108 is firmly attached to the separator 106 to avoid lithium plating at the interface. As a non-limiting example, the adhesive layers 110, 112 can be applied to the areas to be laminated and heated with pressure (e.g. ~85 ° C.). Other methods and adhesives known to those skilled in the art are contemplated herein. The adhesive layers 110, 112 can be of the same material or can be different materials.

Figure 9:
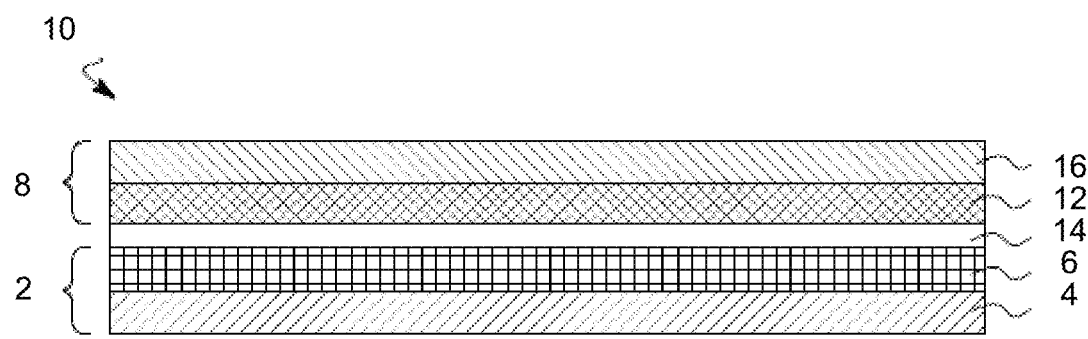
FIG. 9 is a cross-sectional view of an exemplary lithium metal battery.

An aspect of the disclosed embodiments is a lithium metal battery 10, the layers of which are shown in cross-section in FIG. 9. The lithium metal battery 10 has an anode 2 as described herein with the current collector 4 representing current collector 102. The anode layer 6 represents the seed layers 104, 204 and host structures 108 as disclosed herein. The lithium metal battery 10 also has a cathode 8 with a cathode current collector 16 and a cathode active material 12 disposed over the cathode current collector 16. The cathode 8 and the anode 2 are separated by a separator 14 representing separator 106.

The cathode current collector 16 can be, for example, an aluminum sheet or foil. Cathode active materials 12 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$.

In some embodiments, the electrolyte may include a liquid electrolyte, a polymer ionic liquid, a gel electrolyte, or a combination thereof. The electrolyte can be an ionic liquid-based electrolyte mixed with a lithium salt. The ionic liquid may be, for example, at least one selected from N-Propyl-N-methylpyrrolidinium bis(flurosulfonyl)imide, N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide. The salt can be or include, for example, a fluorosulfonyl (FS0) group, e.g., lithium bisfluorosulfonylimide ($LiN(FS0_2)_2$, (LiFSI), $LiN(FS0_2)_2$, $LiN(FS0_2)(CF_3S0_2)$, $LiN(FS0_2)(C_2F_5S0_2)$.

In some embodiments, the electrolyte is or includes a cyclic carbonate (e.g., ethylene carbonate (EC) or propylene carbonate, a cyclic ether such as tetrahydrofuran (THF) or tetrahydropyran (TH), a glyme such as dimethoxyethane (DME) or diethoxyethane, an ether such as diethylether (DEE) or methylbutylether (MBE), their derivatives, and any combinations and mixtures thereof.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. An anode for a lithium metal battery, comprising:
    a current collector;
    a seed layer deposited onto the current collector, the seed layer comprising a seed material selected to promote electrochemical plating of metallic lithium onto the seed layer;
    a separator;
    a host structure between the seed layer and the separator, the host structure having void spaces configured to host metallic lithium during charging, wherein the host structure has a void space of ≥60% and ≤80%;
    a first adhesion layer bonding the host structure to the seed layer; and
    a second adhesion layer bonding the host structure to the separator.

2. The anode of claim 1, wherein the host structure is a layer of material having columnar voids created through a thickness of the layer, each columnar void having a diameter of between 0.5 µm and 5µm, inclusive.

3. The anode of claim 2, wherein the columnar voids are each the same diameter.

4. The anode of claim 2, further comprising a coating of additional seed material on an internal surface of the columnar voids to promote wetting of the metallic lithium.

5. The anode of claim 1, wherein the host structure is formed of fibers of a material selected from the group consisting of polyvinylidene fluoride, polyacrylonitrile, cellulose, polyvinyl alcohol, glass, aramid fibers, porous polyimide and combinations thereof.

6. The anode of claim 5, wherein the host structure has voids each having a diameter of between 0.5 µm and 5 µm.

7. The anode of claim 5, further comprising a coating of additional seed material on the fibers to promote wetting of the metallic lithium.

8. The anode of claim 1, wherein the host structure has a thickness that is ≥20 µm and ≤40 µm.

9. The anode of claim 1, wherein the seed layer is a first layer of one or more of copper, tin, zinc, silicon.

10. The anode of claim 9, wherein the seed layer comprises a second layer of lithium metal deposited on the first layer.

11. The anode of claim 1, wherein the seed layer is one or more of Sn, SnO and SnN.

12. The anode of claim 1, wherein the seed layer is one or a combination of lithium and lithium alloys.

13. The anode of claim 1, wherein the seed layer has a thickness that is ≥10 nm and ≤200 nm.

14. An anode for a lithium metal battery, comprising:
a current collector;
a seed layer deposited onto the current collector, the seed layer comprising a material that promotes lithium plating;
a separator;
a host structure between and bonded to the seed layer and the separator, the host structure having a total void space of ≥60% and ≤80%; and
a coating of a lithiophilic material on a surface of the host structure defining the individual void spaces.

15. The anode of claim 14, wherein the host structure is bonded to the separator and the seed layer with a bonding layer of porous polyvinylidene fluoride, porous polyvinylidene fluoride with a ceramic particle filler, or a polymer electrolyte.

16. The anode of claim 14, wherein the host structure is a layer of material having columnar voids created through a thickness of the layer, each columnar void having a diameter of between 0.5 μm and 5 μm, inclusive.

17. The anode of claim 14, wherein the seed layer is a first layer of one or more of copper, tin, zinc, silicon.

18. The anode of claim 14, wherein the seed layer is one or a combination of lithium and lithium alloys.

19. The anode of claim 14, wherein individual void spaces have a diameter between 0.5 μm and 5.0 μm, inclusive.

20. An anode for a lithium metal battery, comprising:
a current collector;
a seed layer deposited onto the current collector, the seed layer comprising a seed material selected to promote electrochemical plating of metallic lithium onto the seed layer;
a separator;
a host structure between the seed layer and the separator, the host structure having void spaces configured to host metallic lithium during charging, wherein the host structure is formed of fibers of a material selected from the group consisting of polyvinylidene fluoride, polyacrylonitrile, cellulose, polyvinyl alcohol, glass, aramid fibers, porous polyimide and combinations thereof;
a first adhesion layer bonding the host structure to the seed layer; and
a second adhesion layer bonding the host structure to the separator.

21. The anode of claim 20, wherein the host structure has a void space of ≥60% and ≤80%.

* * * * *